(12) United States Patent
Franczuz

(10) Patent No.: US 11,147,220 B2
(45) Date of Patent: Oct. 19, 2021

(54) HYDROPONIC GROWTH SYSTEM AND PLANT TRAY ASSEMBLY THEREOF

(71) Applicant: Rapidgrow Industries Inc., Maple Ridge (CA)

(72) Inventor: Brian Franczuz, Maple Ridge (CA)

(73) Assignee: Rapidgrow Industries Inc., Maple Ridge (CA)

( * ) Notice: Subject to any disclaimer, the term of this patent is extended or adjusted under 35 U.S.C. 154(b) by 889 days.

(21) Appl. No.: 15/899,757

(22) Filed: Feb. 20, 2018

(65) Prior Publication Data

US 2019/0254240 A1  Aug. 22, 2019

(51) Int. Cl.
*A01G 31/02*  (2006.01)

(52) U.S. Cl.
CPC .................... *A01G 31/02* (2013.01)

(58) Field of Classification Search
CPC ......... A01G 31/02; A01G 9/045; A01G 27/02
See application file for complete search history.

(56) References Cited

U.S. PATENT DOCUMENTS

| | | | | |
|---|---|---|---|---|
| 2,188,875 A | * | 1/1940 | Ellis ........................ | A01G 31/02 47/62 R |
| 2,241,699 A | | 5/1941 | Cooper | |
| 2,592,976 A | * | 4/1952 | Thomas .................. | A01G 31/02 47/62 R |
| 2,983,076 A | | 5/1961 | Merrill | |
| 3,271,900 A | * | 9/1966 | Mori ....................... | A01G 27/06 47/80 |
| 3,451,162 A | * | 6/1969 | Rasmussen ............ | A01G 31/02 47/62 E |
| 4,033,072 A | * | 7/1977 | Kobayashi ............. | A01G 9/023 47/62 R |
| 4,056,899 A | * | 11/1977 | Close ..................... | A01G 27/00 47/79 |
| 4,419,842 A | | 12/1983 | Paloian | |
| 4,669,217 A | | 6/1987 | Fraze | |
| 4,754,571 A | * | 7/1988 | Riechmann .......... | A01K 63/003 47/59 R |
| 4,882,875 A | * | 11/1989 | Green ................... | A01G 27/005 47/79 |
| 5,337,515 A | * | 8/1994 | Robins ................... | A01G 31/02 47/62 E |
| 5,860,247 A | | 1/1999 | Newby | |

(Continued)

FOREIGN PATENT DOCUMENTS

| | | |
|---|---|---|
| JP | 2006262762 | 10/2006 |
| WO | 2010008813 | 1/2010 |

*Primary Examiner* — Magdalena Topolski
(74) *Attorney, Agent, or Firm* — Nicholas Garner; Oyen Wiggs Green & Mutala LLP

(57) ABSTRACT

A hydroponic growth system comprises a reservoir including a lower chamber, an upper chamber, and a divider therebetween. The divider has a first aperture and a second aperture. The system includes an air blower in fluid communication with the lower chamber. Actuation of the air blower causes fluid from the lower chamber to pass through the first aperture and selectively flood the upper chamber. The valve inhibits communication between the lower chamber and the upper chamber via the second aperture in a resting state. Upon actuation of the air blower, the valve moves to a flooding state in which communication between the lower chamber and the upper chamber via the second aperture is promoted.

20 Claims, 10 Drawing Sheets

(56) References Cited

U.S. PATENT DOCUMENTS

| | | | |
|---|---|---|---|
| 5,887,383 | A | 3/1999 | Soeda |
| 5,992,092 | A | 11/1999 | Furuta |
| 6,584,730 | B1 * | 7/2003 | Mai ................ A01G 27/02 47/48.5 |
| 6,622,430 | B1 * | 9/2003 | Lai ................ A01G 27/005 47/79 |
| 7,516,574 | B2 | 4/2009 | Gottlieb et al. |
| 8,146,292 | B2 * | 4/2012 | Brandstatter .......... A01G 27/02 47/81 |
| 2005/0000159 | A1 * | 1/2005 | Billette ................ A01G 31/02 47/79 |
| 2009/0313894 | A1 | 12/2009 | Bieber |
| 2013/0081327 | A1 * | 4/2013 | Buck ................ A01G 31/02 47/62 A |
| 2013/0255152 | A1 * | 10/2013 | Johnson ................ A01G 31/06 47/62 C |
| 2014/0075841 | A1 * | 3/2014 | Degraff ................ A01G 31/02 47/62 A |
| 2020/0008374 | A1 * | 1/2020 | Coleman ................ A01G 31/02 |

* cited by examiner

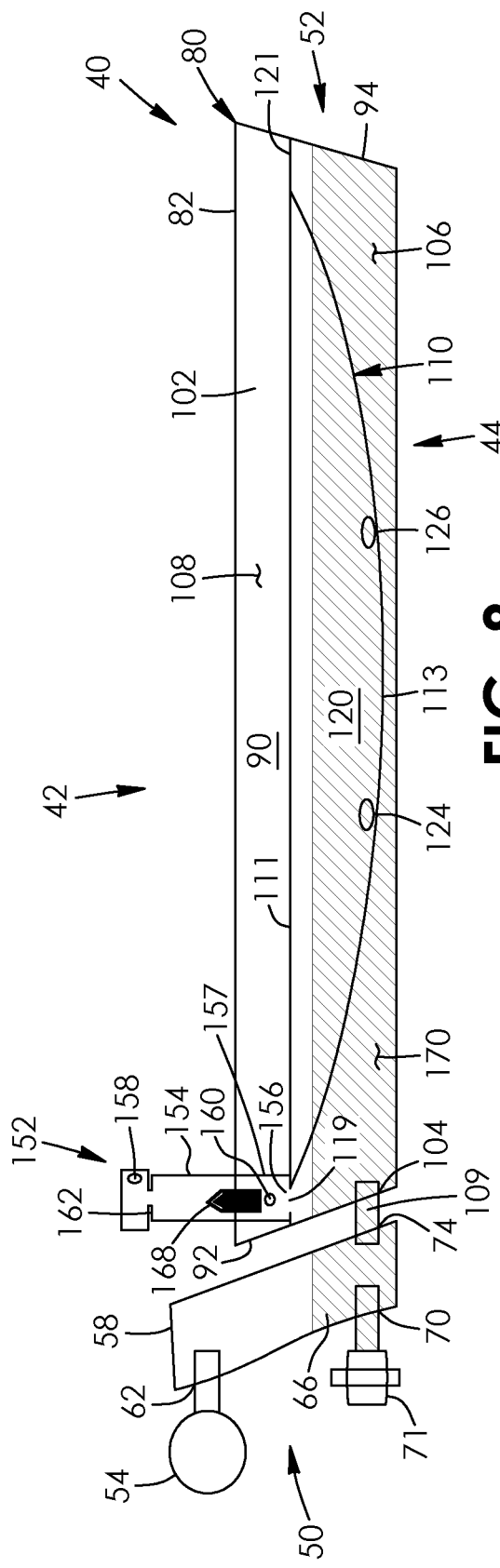
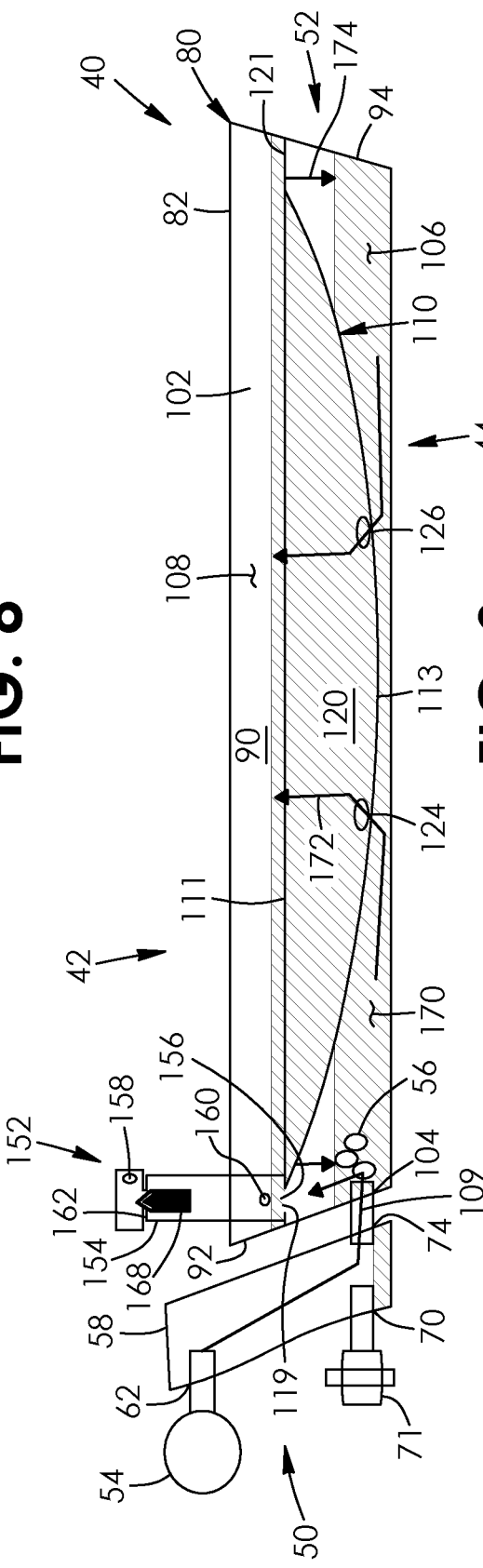

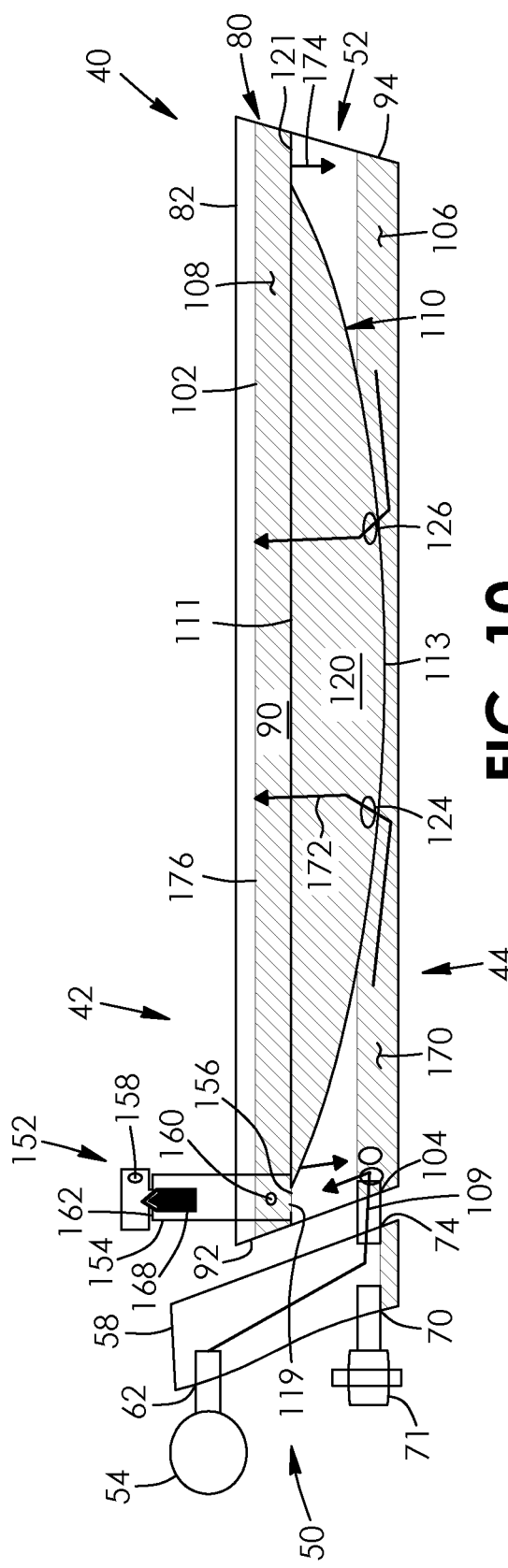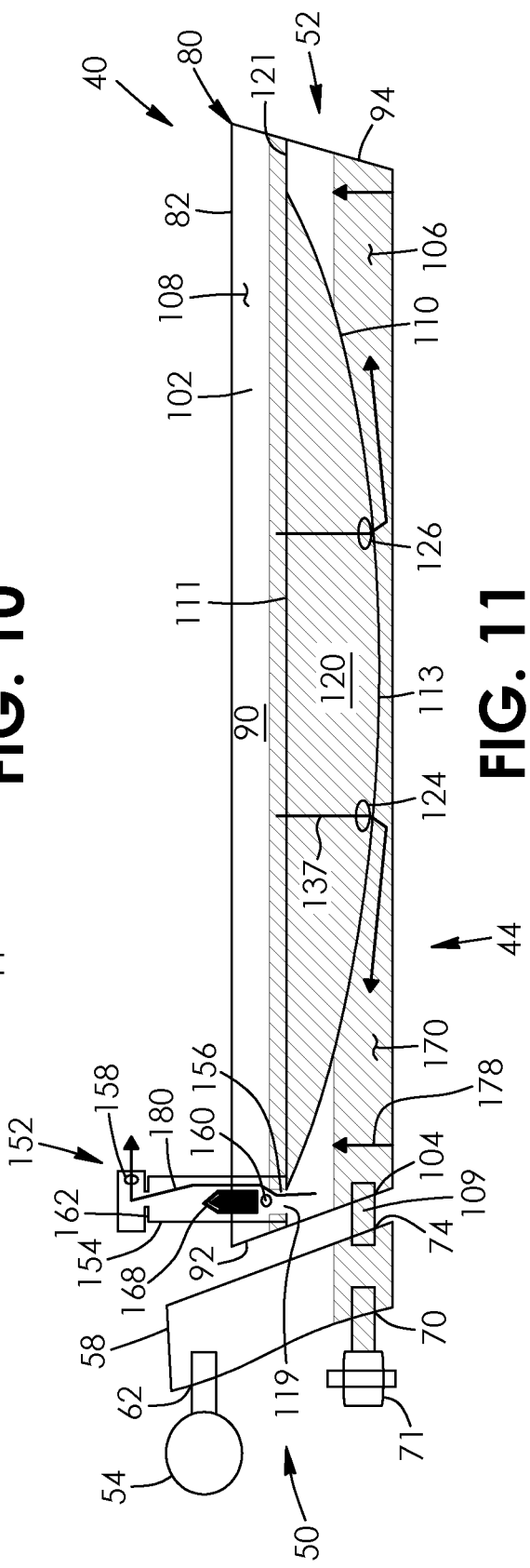

HYDROPONIC GROWTH SYSTEM AND PLANT TRAY ASSEMBLY THEREOF

FIELD OF THE INVENTION

There is provided a growth system. In particular, there is provided a hydroponic growth system, and a plant tray assembly thereof.

DESCRIPTION OF THE RELATED ART

U.S. Pat. No. 4,419,842 to Paloian discloses a hydroponic device. The device includes a hollow housing which defines a substantially closed lower chamber for receiving a liquid nutrient solution and a top open-ended upper chamber for receiving an inert filler material and the desired vegetation which are separated by a partition wall. At least one nutrient supply pipe is coupled to the partition wall and extends downwardly into the lower chamber. The supply pipe has a throughput bore extending therethrough to establish fluid communication between the upper chamber and the lower chamber, whereby the nutrient solution may be fed in a continuous cycle from the lower chamber to the upper chamber and back again.

U.S. Pat. No. 5,860,247 to Newby discloses a multiple function hydroponics system consisting of three major components: a plant pot container, a reservoir container and a pumping chamber. The plant pot container has a drainage tube down into the reservoir. This drainage tube height is adjusted to determine the upper level that the liquid can reach within the plant pot container. For an ebb and flow type operation of the assembly there is a siphon tubes from the bottom of the plant pot container back into the pumping chamber to drain the plant pot container each cycle. For top down watering or a drip system a watering tube assembly is installed so that each plant has a fluid outlet opening. The liquid pumping chamber, which contains a cycling container, is connected to the bottom of the reservoir with tubing and a one way valve allowing liquid to enter. When in the top down watering mode, the height of the drainage tube within the plant pot container is lowered so as to allow complete drainage back into the reservoir. The incoming pressurized air coming into the pumping chamber enters at the lowest level so as to aerate the water. In operation with the cycling container resting near the bottom of the liquid pumping chamber the gas within the system is expanded in the pumping chamber, the resultant pressure build-up in turn forces liquid out of the cycling container tube and the siphoning tube. When the liquid in the chamber reaches a predetermined level, the pressurized gas is released to the atmosphere through the cycling container tube, liquid from the plant pot container refills the pumping chamber through the siphon tube, and the reservoir as the pumping chamber is now open to the atmosphere. When the pumping chambers refill to a predetermined level, the cycling container sinks and the cycle repeats.

BRIEF SUMMARY OF INVENTION

There is provided, and it is an object to provide, an improved hydroponic growth system and plant tray assembly thereof.

There is accordingly provided a hydroponic growth system. The system comprises a reservoir including a lower chamber, an upper chamber, and a divider therebetween. The divider has a first aperture and a second aperture. The system includes an air blower in fluid communication with the lower chamber. Actuation of the air blower causes fluid from the lower chamber to pass through the first aperture and selectively flood the upper chamber. The valve inhibits communication between the lower chamber and the upper chamber via the second aperture in a resting state. Upon actuation of the air blower, the valve moves to a flooding state in which communication between the lower chamber and the upper chamber via the second aperture is promoted.

There is also provided a hydroponic tray assembly. The assembly includes a lower chamber, an upper chamber, and a divider between the chambers. The divider has a first aperture, has a second aperture, and includes at least one central channel which extends between opposite ends of the assembly. The first aperture extends through the channel. The channel is arcuate-shaped in longitudinal cross-section between the ends of the assembly.

There is further provided a hydroponic tray assembly. The assembly includes a lower chamber, an upper chamber, and a divider between the chambers. The divider has a first aperture, has a second aperture, and includes at least one plurality of concentrically positioned and radially spaced-apart set of arcuate-shaped baffles.

BRIEF DESCRIPTION OF DRAWINGS

The invention will be more readily understood from the following description of preferred embodiments thereof given, by way of example only, with reference to the accompanying drawings, in which:

FIG. 8 is a side elevation schematic view of the hydroponic growth assembly of FIG. 1, with the assembly shown in a rest mode;

FIG. 9 is a side elevation schematic view of the hydroponic growth assembly of FIG. 1, with the assembly shown in a partially flooded mode;

FIG. 10 is a side elevation schematic view of the hydroponic growth assembly of FIG. 1, with the assembly shown in a fully flooded mode;

FIG. 11 is a side elevation schematic view of the hydroponic growth assembly of FIG. 1, with the assembly shown in a drain mode;

DESCRIPTION OF THE PREFERRED EMBODIMENTS

Figure 1:
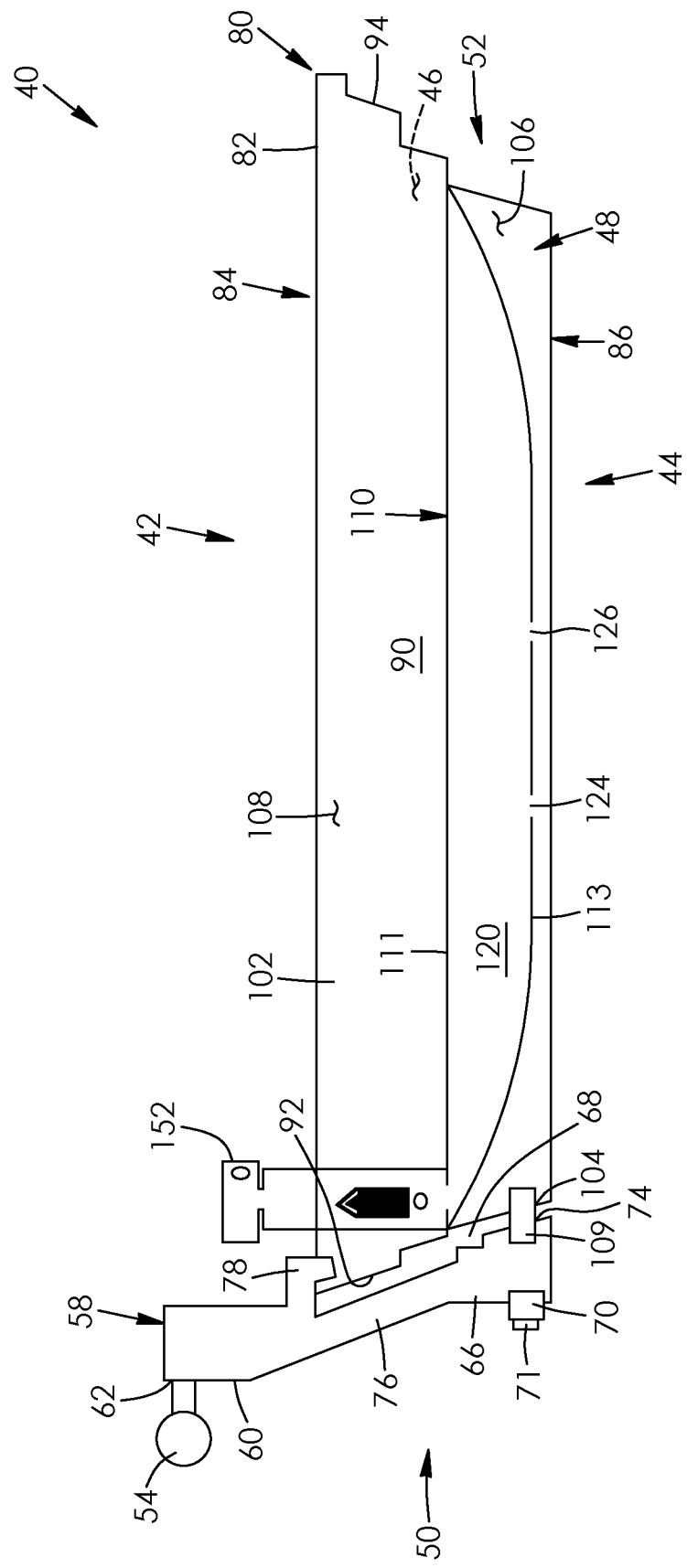
FIG. 1 is a side elevation schematic view of a hydroponic growth assembly accordingly to a first aspect, the system including an air blower, a manifold, a shuttle valve and a plant tray assembly.

Referring to the drawings and first to FIG. 1, there is shown a hydroponic growth system 40. The assembly has a top 42, bottom 44, a pair of spaced-apart sides 46 and 48, and a pair of spaced-apart ends 50 and 52.

Figure 2:
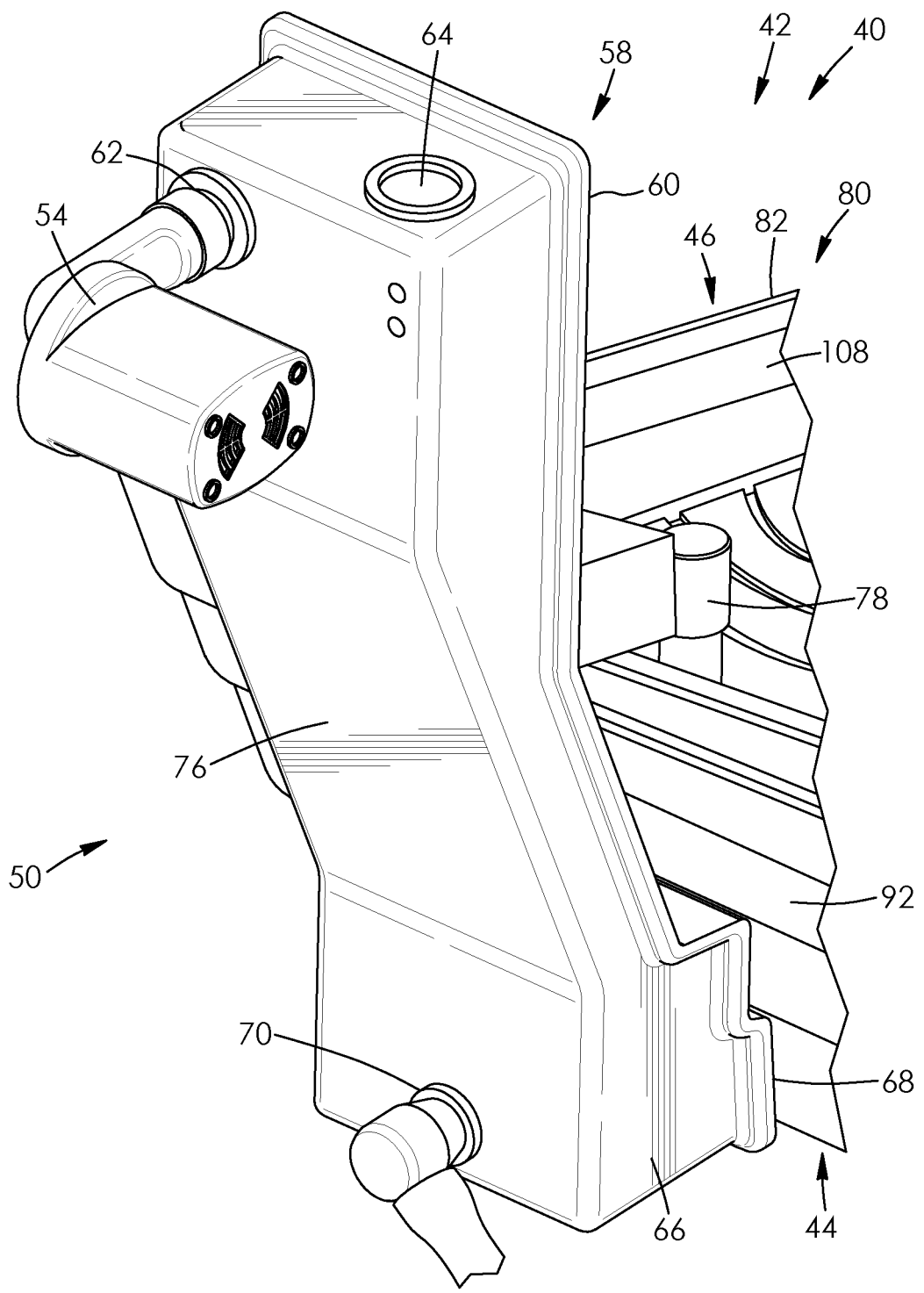
FIG. 2 is a side perspective view of the air blower and the manifold of FIG. 1, with the air blower shown coupled to the manifold and the manifold shown coupled to a part of the plant tray assembly of FIG. 1, the plant tray assembly being shown in fragment.

As seen in FIG. 2, the growth system includes an air blower 54 configured to selectively emit bubbles 56 seen in FIG. 9. The air blower is positioned along end 50 and adjacent to top 42 of the system 40 in this example. Air blowers per se, including their various parts and functions, are known to those skilled in the art and thus blower 54 will not be described in further detail.

Referring to FIG. 2, the growth system 40 includes a hollow manifold 58 which aligns with end 50 of the system. The manifold has an upper portion 60 that is generally a rectangular prism in its outer form in this example and which extends from the top 42 of the system towards bottom 44 of the system. The manifold has a first inlet, in this example an air inlet 62 aligned with the end 50 of the system 40, which extends through the upper portion of the manifold, and which is in fluid communication with the air blower 54.

The manifold has a second inlet, in this example a fertilizer inlet 64 which aligns with the top 42 of the system and which extends into the upper portion 60 of the manifold. The fertilizer inlet is shaped to selectively receive fertilizer (not shown) therethrough. The fertilizer inlet 64 is configured to selectively engage with a fertilizer cap (not shown) in this example.

The manifold 58 has a lower portion 66 which aligns with the bottom 44 of the system 40 and which is adjacent to the end 50 of the system. The lower portion of the manifold is generally a rectangular prism in outer form and, as seen in FIG. 1, is positioned towards end 52 of the system 40, relative to upper portion 60 of the manifold. As seen in FIG. 1, the lower portion 66 of the manifold 58 has a recessed section 68 facing end 52 of the system 40.

The manifold 58 has an outlet 70 to selectively drain fluid therefrom by removing plug 71. The outlet extends into the lower portion 66 of the manifold and aligns with the bottom 44 of the system. The outlet 70 is shaped to selectively receive a drain plug 72 that may be selectively removed to periodically drain the manifold as desired.

As seen in FIG. 1, the manifold 58 includes a port 74 which faces end 52 of the system 40 in this example and which is adjacent to the bottom of the system. The outlet 70 of the manifold is positioned level with or below the port of the manifold, in this example.

Referring to FIG. 2, the manifold 58 has a passageway portion 76 which couples the upper portion 60 and the lower portion 66 of the manifold together. The passageway portion is generally a rectangular prism in outer form and angles inwards as the passageway portion extends from the upper portion to the lower portion of the manifold in this example. The upper portion, connecting portion and lower portion of the manifold are integrally connected and formed in this example and in fluid communication with each other. As seen in FIG. 1, the manifold 58 includes a hook-shaped portion, in this example a clip 78 between the upper portion and the connecting portion thereof in this example.

Figure 3:
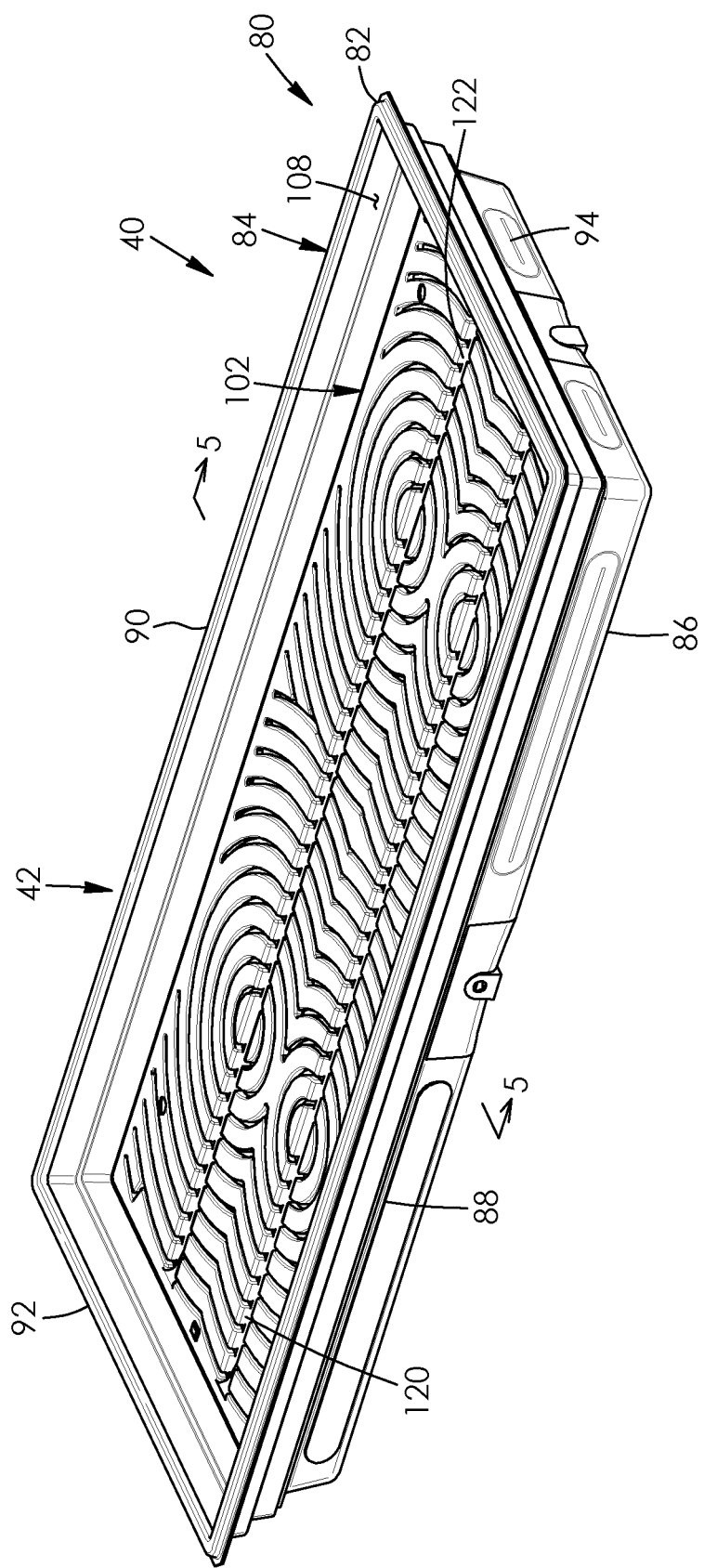
FIG. 3 is a top, side perspective view of the plant tray assembly of FIG. 1.
Figure 4:
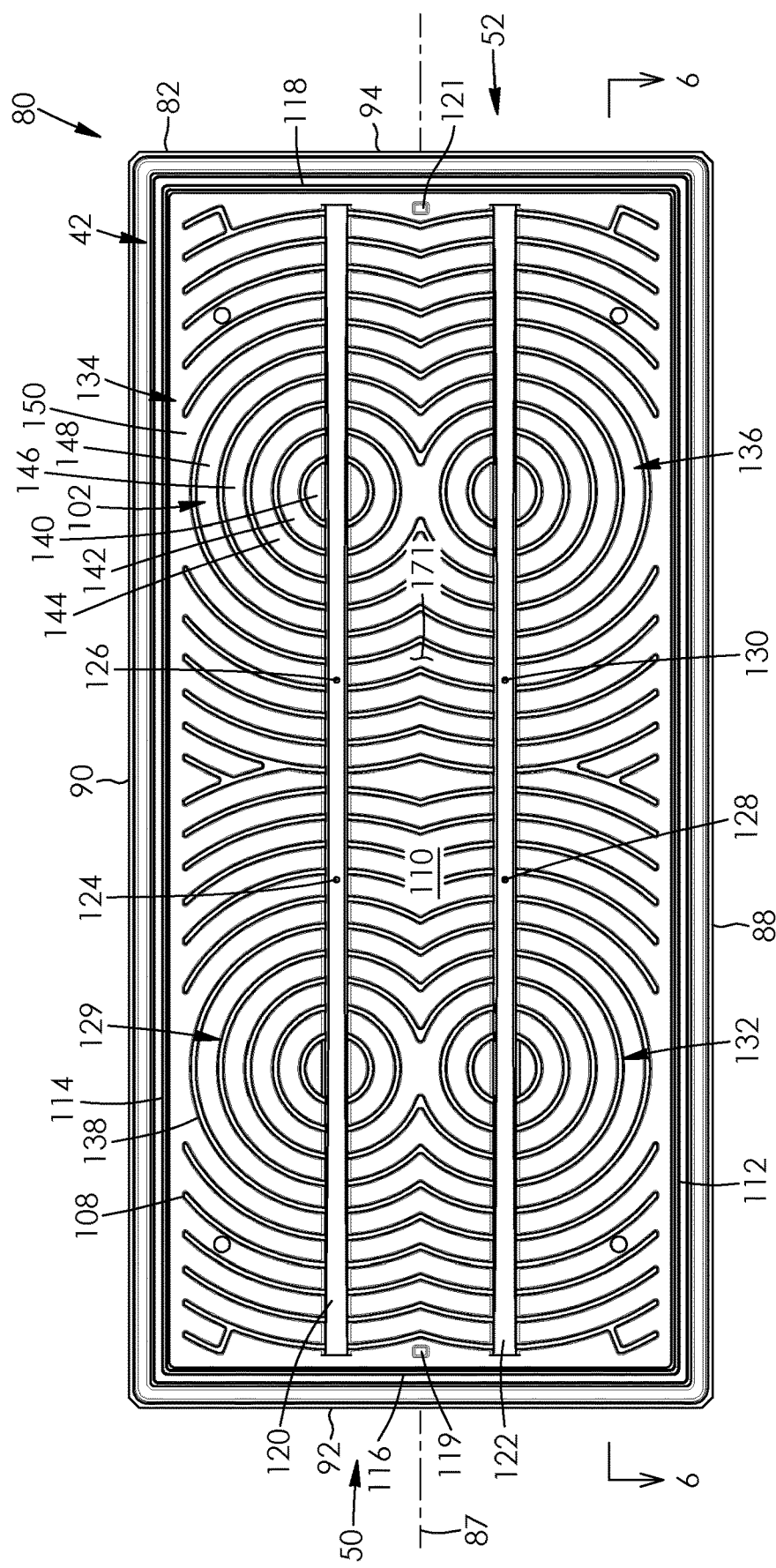
FIG. 4 is a top plan view of the plant tray assembly of FIG. 5.

As best seen in FIG. 3, the growth system 40 includes a reservoir, in this example a hydroponic, plant tray assembly 80. The assembly includes a container 82 having a top 84 and a bottom 86. As seen in FIG. 4, the container has a longitudinal axis 87, a pair of sides 88 and 90 which extend parallel with said axis, and a pair of ends 92 and 94 extending between the sides. The bottom 86, sides and ends are each generally rectangular in shape in this example. The sides and ends of the container 82 couple to and extend upwards from the bottom 86 of the container towards the top of the container.

Figure 5:
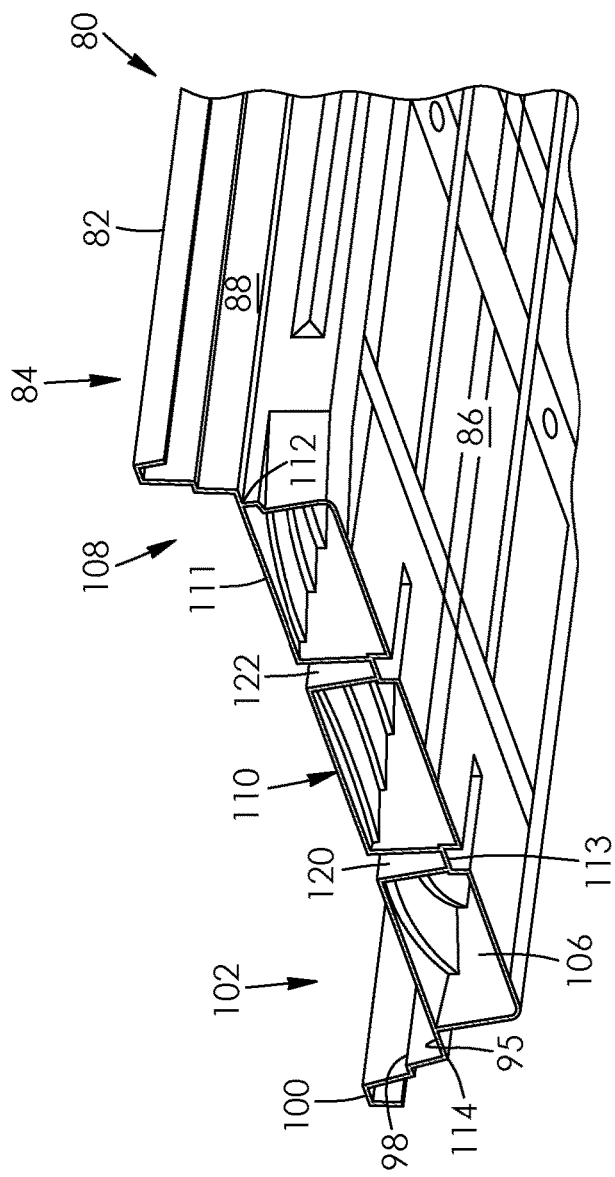
FIG. 5 is a sectional end view of the plant tray assembly of FIG. 3 taken along lines 5-5 of FIG. 3.

As seen in FIG. 5, the sides and ends of the container extend incrementally outwards from the bottom of the container, so as to form a plurality of steps 95 and 98 and an upper rim 100 within the interior 102 of the container in this example. As seen in FIG. 2, the recessed section 68 of the lower portion 66 of the manifold 58 is shaped to receive the corresponding contoured end 92 of the container 82 in this example. As seen in FIG. 1, clip 78 is shaped to extend about and couple to the upper rim 100 of the container to selectively couple the manifold to the container.

Still referring to FIG. 1, the container 82 has a lower aperture 104 adjacent to the bottom 86 thereof and bottom 44 of the system 40. The aperture extends through end 92 of the container.

The plant tray assembly 80 has a lower chamber 106, an upper chamber 108 and a divider 110 extending between the chambers. As seen in FIG. 1, the lower chamber is enclosed by the sides 90 of the container 82, ends 92 and 94 of the container, the bottom 86 of the container 82, and the divider. The system 40 includes a conduit, in this example tube 109 which extends between port 74 of the manifold 58 and aperture 104 of the container which is located within the lower chamber 106. Port 74 is thus in fluid communication with the lower chamber 106 of the plant tray assembly 80.

The upper chamber 108 is enclosed by the sides 90 of the container, ends 92 and 94 of the container, and extends from the top 84 of the container to the divider 110.

Figure 6:
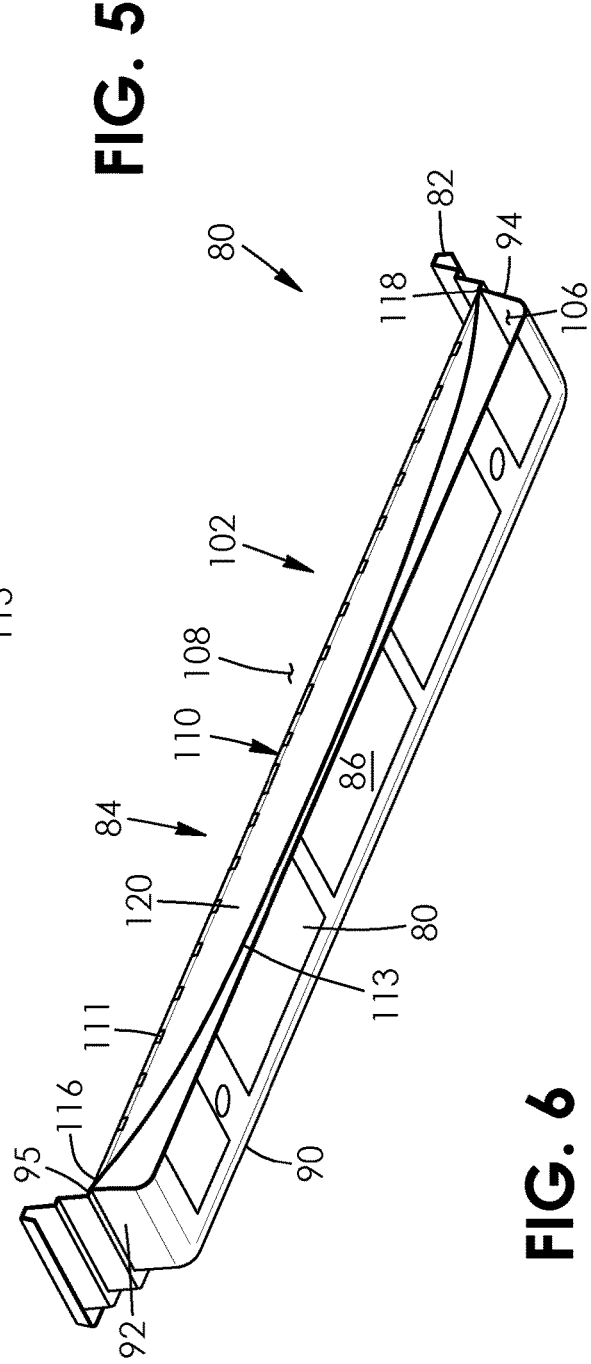
FIG. 6 is a longitudinal sectional view of the plant tray assembly of FIG. 4 taken along lines 6-6 of FIG. 4.

The divider is received within the interior 102 of the container 82. As seen in FIG. 1, the divider 110 has a top 111 positioned between the top 84 and bottom 86 of the container. As seen in FIG. 4, the top of the divider is generally rectangular in shape. Referring back to FIG. 1, the divider 110 has a bottom 113 positioned adjacent to the bottom 86 of the container 82. The top 111 of the divider has a pair of spaced-apart sides 112 and 114 which align with and abut the sides 88 and 90 of the container. The top of the divider 110 has a pair of spaced-apart ends 116 and 118 which align with and abut the ends 92 and 94 of the container. As seen in FIGS. 5 and 6, the sides 112 and 114 and ends 94 and 96 of the top of the divider abut and rest upon and on top of step 95 of the container 82 in this example.

As seen in FIG. 4, the divider 110 has a pair of upper apertures, in this example a shuttle valve aperture 119 and a third or overflow aperture 121 which extend through the divider. The apertures are adjacent to respective ends 116 and 118 of the top of the divider in this example and are positioned between the sides 112 and 114 of the top of the divider in this example. As seen in FIG. 9, the air blower is configured to emit air bubbles 56 below the shuttle valve aperture 119 and in this example adjacent to the shuttle valve aperture.

Referring to FIG. 4, the divider 110 includes a pair of spaced-apart, centrally-positioned, longitudinally-extending channels 120 and 122 which extend between ends 50 and 52 of the assembly in this example. The channels are positioned between the sides 112 and 114 of the divider and parallel to the sides in this example. As seen in FIG. 5, the channels 120 and 122 extend from the top 111 of the divider 110 to the bottom 113 of the divider. Still referring to FIG. 5, each channel has a u-shape when viewed in lateral cross-section in this example. As seen in FIG. 6, each channel is arcuate-shaped in longitudinal cross-section between the ends 94 and 96 thereof in this example.

As seen in FIG. 4, the channel 120 has a pair of centrally-positioned flooding apertures 124 and 126 extending therethrough and channel 122 has a pair of centrally-flooding apertures 128 and 130 extending therethrough. As seen in FIG. 8, each of the flooding apertures 124 and 128 of the channels 120 is adjacent to the bottom 113 of the divider 110. The flooding apertures may be referred to as first apertures and the shuttle valve aperture 119 may be referred to as a second aperture.

Referring to FIG. 4, the divider 110 includes a plurality of sets 129, 132, 134 and 136 of radially spaced-apart sets of arcuate-shaped baffles 138, with each set being concentric about a portion of a respective one of the channels. The baffles are ribs in this example. Each of the baffles extends upwards from the top 111 of the divider towards the top 42 of the system 40 seen in FIG. 3. Pairs of adjacent baffles form arcuate-shaped channels which are in fluid communication with its respective channel. This is shown by arcuate-shaped channels 140, 142, 144, 146, 148 and 150 of set 134 of baffles which are in fluid communication with channel 120. In this manner, the baffles function to promote selective dispersion of fluid from the channels to the upper chamber 108 of the assembly 80.

Figure 7:
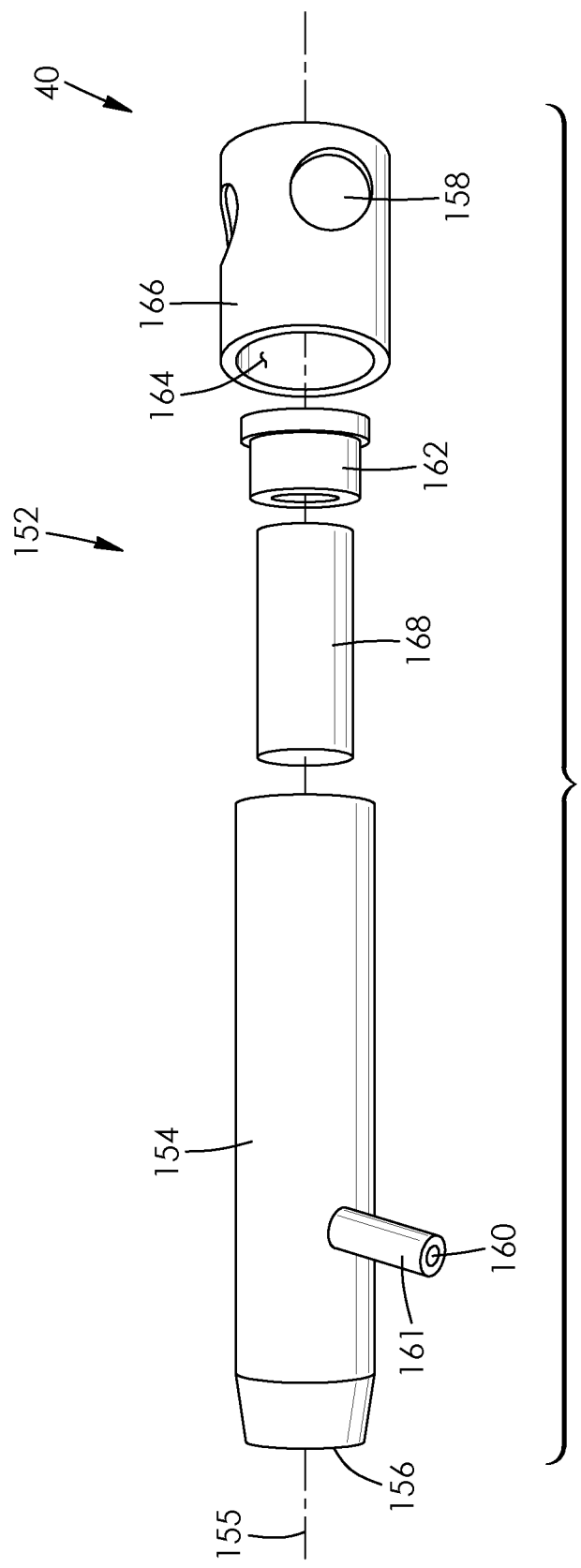
FIG. 7 is an exploded view of the shuttle valve of FIG. 1.

As seen in FIG. 7, the growth system 40 includes a shuttle valve 152. The shuttle valve includes an elongate valve chamber 154 having a longitudinal axis 155 and which is tubular and in the shape of a pipe in this example. The valve chamber has a lower opening 156, a plurality of circumferentially spaced-apart upper openings 158, and an intermediate side opening 160 between the lower and upper openings. The valve chamber is tubular and in the shape of a pipe in this example. As seen in FIG. 8, the shuttle valve 152 extends above shuttle valve aperture 119 in this example, with the lower opening 156 being in communication with the lower chamber 106. The lower portion 157 of the valve chamber 154 of the shuttle valve extends about aperture 119 in this example, though is not strictly required. As seen in FIG. 7, the intermediate side opening 160 of the valve chamber 154 is positioned within the upper chamber 108 in this example, and extends through a pin 161 in this example. The upper openings 158 of the valve chamber are spaced-apart above the upper chamber of the container 82 in this example.

As seen in FIG. 7, the shuttle valve 152 includes an upper valve seat 162, which may be a pipe washer, for example. The upper valve seat is shaped to be received within the interior 164 of the upper portion 166 of the shuttle valve. The shuttle valve includes a valve element 168 moveable within the valve chamber 154 in parallel with the longitudinal axis 155 in this example. The valve element is cylindrical in shape in this example.

In operation and referring to FIG. 8, plant growth fluid 170 from the lower portion 66 of the manifold 58 passes into the lower chamber 106 of the container 82 via port 74, tube 109 and lower aperture 104 so as to at least partially fill the lower chamber with the plant growth fluid. The fluid also passes through the flooding apertures 124 and 126 so as to partially fill the channels 120 of the divider 110.

The valve element 168 of the shuttle valve 152 functions to block lower opening 156 of the valve chamber 154 in a resting state and thus inhibits communication between the lower chamber 106 and upper chamber 108 thereby.

Referring to FIG. 9, the air blower 54 is actuated to selectively flood the upper chamber 108 with the fluid. The air blower blows air bubbles 56 through the manifold 58 and into the lower chamber 106. The air bubbles within the lower chamber rise upwards through the shuttle valve aperture 119 and lower opening 156 of the shuttle valve 152, causing the valve element 168 to rise upwards, and abut the upper valve seat 162. The valve element blocks the upper openings 158 of the shuttle valve in this flooding state. This inhibits fluid communication between lower chamber 106 and the upper openings 158 of the shuttle valve. Thus, upon actuation of the air blower, the shuttle valve 152 moves to the flooding state shown in FIG. 9 in which communication between the lower chamber 106 and upper chamber 108 via the shuttle valve aperture 119 is promoted.

The actuation of the air blower 54 further promotes movement of the fluid 170 from the lower chamber 106 through the flooding apertures 124 and 126 and into the upper chamber 108, as shown by arrow of numeral 172 in FIG. 9. Referring to FIG. 4, the baffles 138 of the divider 110 thereafter function to promote selective dispersion of fluid from the channels 140, 142, 144, 146, 148 and 150 to the upper chamber 108 of the assembly 80.

As seen in FIG. 9, overflow aperture 121 enables fluid from the upper chamber 108 to flow back to the lower chamber 107, as shown by arrow of numeral 174. In this manner, fluid 170 recirculates between the lower and upper chambers in this flooding state. Flooding fluid in the upper chamber may also cover aperture 119 in the flooding state, with air bubbles 56 coming into contact with said flooding fluid. FIG. 10 shows the system 40 in a more fully flooded state in which the upper chamber is more completely filled with fluid and in which the intermediate side opening 160 of the shuttle valve 152 is submerged below the waterline 176 of the fluid.

FIG. 11 shows the system 40 in a drain mode in which the air blower 54 is no longer operational. The cessation of forced air bubbles into the lower chamber 106, together with the weight of the fluid within the upper chamber 108, causes the fluid from the upper chamber to pass through the flooding apertures 124 and 126 and drain into the lower chamber 106. This is seen by arrow of numeral 177. This causes fluid levels within the lower chamber to rise, as seen by arrow of numeral 178.

Cessation of the forced air bubbles also causes the valve element 168 to lower towards its resting state, covering the lower opening 156. The dislodgement of the valve element downwards enables air to escape from the lower chamber, pass through the shuttle valve 152 and exit via the upper openings 158 of the shuttle valve, as seen by arrow of numeral 180. Removal of plug 71 from the outlet 70 of the manifold 58 enables the lower chamber 106 to be further drained as desired.

Figure 12:
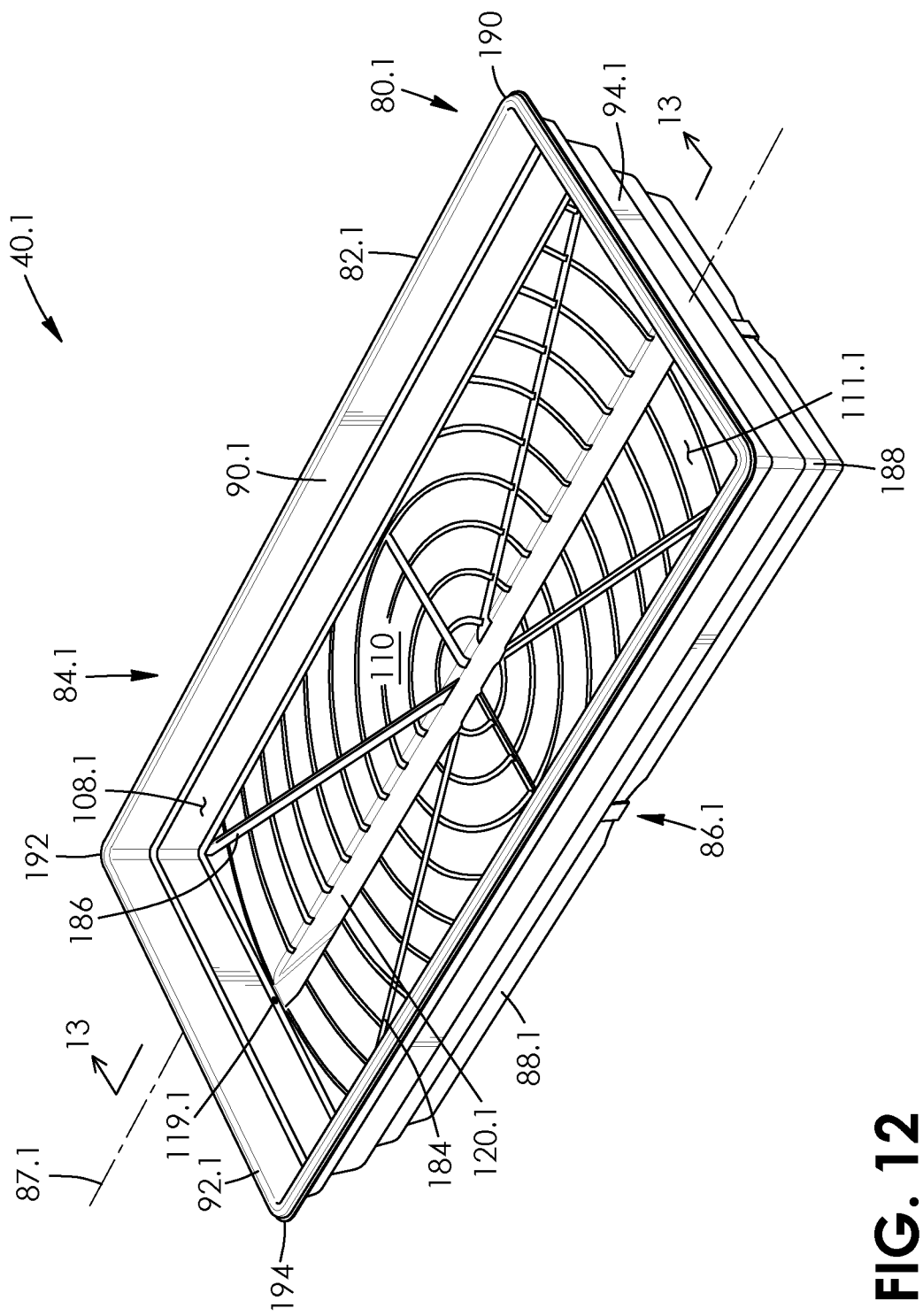
FIG. 12 is a top, side perspective view of a plant tray assembly for a hydroponic growth assembly according to a second aspect.
Figure 13:
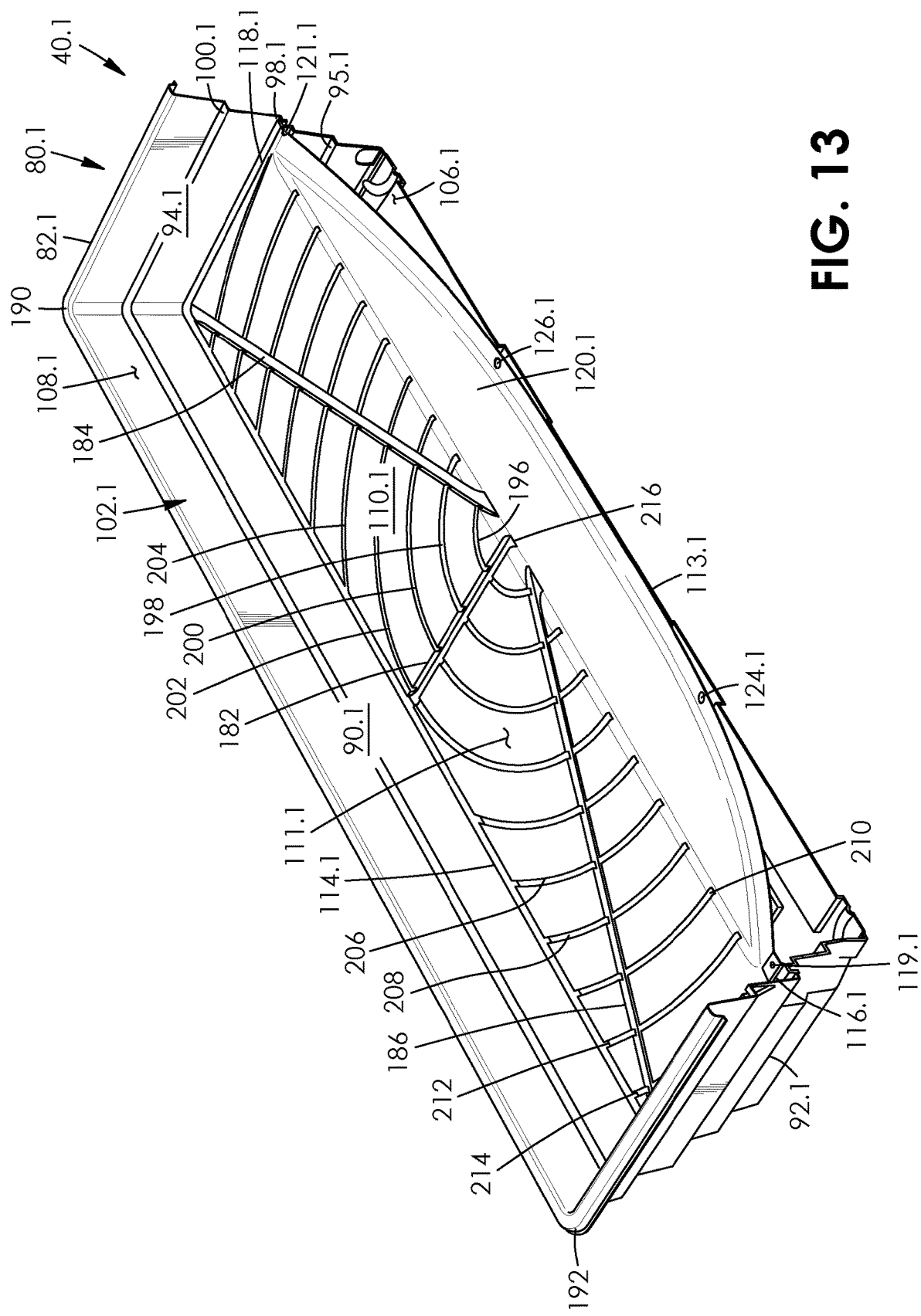
FIG. 13 is a longitudinal sectional perspective view of the plant tray assembly of FIG. 12 taken along lines 12-12 of FIG. 12.

FIGS. 12 to 13 show a hydroponic, plant tray assembly 80.1 for a hydroponic growth system 40.1 according to a second aspect. Like parts have like numbers and functions as the assembly and system shown in FIGS. 1 to 11 with the addition of decimal extension "0.1". Plant tray assembly 80.1 is substantially the same as the plant tray assembly 80 shown in FIGS. 1 to 11 with at least the following exceptions.

In this case, divider 110.1 has only a single longitudinally-extending channel 120.1 extending between ends 50.1 and 52.1 of the assembly in this example. The channel is centrally-positioned between the sides 88.1 and 90.1 of the container 82.1 in this example.

As seen in FIG. 13, the top 111.1 of the divider 110.1 includes a laterally-extending groove 182 positioned between the ends 92.1 and 94.1 of the container and in communication with channel 120.1 The top of the divider further includes a pair of diagonally-extending grooves 184 and 186 which extend through the channel and which extend between opposite corners 188 and 192, and 190 and 194 of the container 82.1, respectively.

The divider 110 has a plurality of radially spaced-apart sets of centrally-positioned arcuate-shaped recesses 196, 198, 200, 202, 204, 206, 208, 210, 212 and 214 with each set being concentric about a central region 216 of the channel 120.1.

It will be appreciated that many variations are possible within the scope of the invention described herein. It will also be understood by someone skilled in the art that many of the details provided above are by way of example only and are not intended to limit the scope of the invention which is to be determined with reference to at least the following claims.

What is claimed is:

1. A hydroponic growth system comprising:
   a reservoir including a lower chamber, an upper chamber, and a divider therebetween, the divider having a first aperture and a second aperture;
   an air blower in fluid communication with the lower chamber, whereby actuation of the air blower causes fluid from the lower chamber to pass through the first aperture and selectively flood the upper chamber; and
   a valve inhibiting communication between the lower chamber and the upper chamber through the second aperture in a first state, and, upon actuation of the air blower, being moved to a second state in which communication between the lower chamber and the upper chamber via the second aperture is permitted, wherein the valve includes a valve chamber having a lower opening corresponding to the second aperture of the divider and in communication with the lower chamber, the valve chamber having an intermediate opening in communication with the upper chamber and the valve chamber having an upper opening, and wherein the valve includes a valve element moveable within the valve chamber, the valve element blocking said lower opening of the valve chamber in the first state and blocking said upper opening of the valve chamber in the second state.

2. A hydroponic growth system comprising:
   a reservoir including a lower chamber, an upper chamber, and a divider therebetween, the divider having a first aperture and a second aperture;
   an air blower in fluid communication with the lower chamber, whereby actuation of the air blower causes fluid from the lower chamber to pass through the first aperture and selectively flood the upper chamber;
   a valve inhibiting communication between the lower chamber and the upper chamber through the second aperture in a first state, and, upon actuation of the air blower, being moved to a second state in which communication between the lower chamber and the upper chamber via the second aperture is permitted; and
   a manifold having a first inlet in fluid communication with the air blower, a port in fluid communication with the lower chamber of the reservoir, and an outlet to selectively drain fluid from the reservoir.

3. The system as claimed in claim 2 wherein the outlet of the manifold is positioned level with or below the port of the manifold.

4. The system as claimed in claim 2 wherein the reservoir is a plant tray assembly.

5. A hydroponic growth system comprising:
   a reservoir including a lower chamber, an upper chamber, and a divider therebetween, the divider having a first aperture and a second aperture;
   an air blower in fluid communication with the lower chamber, whereby actuation of the air blower forces air bubbles into the lower chamber, causing fluid from the lower chamber to pass through the first aperture and selectively flood the upper chamber thereby; and
   a valve inhibiting communication between the lower chamber and the upper chamber through the second aperture in a first state, and, upon actuation of the air blower, being moved to a second state in which communication between the lower chamber and the upper chamber via the second aperture is permitted, wherein the valve includes a valve chamber having a lower opening corresponding to the second aperture of the divider and in communication with the lower chamber, the valve chamber having an intermediate opening in communication with the upper chamber and the valve chamber having an upper opening, and wherein the valve includes a valve element moveable within the valve chamber, whereby actuation of the air blower further causes the air bubbles thereof to rise upwards through the lower opening of the valve chamber and causes the valve element to rise upwards and block the upper opening of the valve chamber.

6. The system as claimed in claim 5 wherein the air blower is configured to emit the air bubbles thereof below the second aperture.

7. The system as claimed in claim 5 wherein the air blower is configured to emit the air bubbles thereof adjacent to the second aperture.

8. The system as claimed in claim 5 wherein the system further includes a manifold, the manifold having an upper portion to which the air blower operatively couples, the manifold having a lower portion in communication with the lower chamber of the reservoir, and wherein one of the reservoir and the manifold includes a hook-shaped member between the upper portion and the lower portion of the manifold and via which the manifold further couples to the reservoir.

9. The system as claimed in claim 5 wherein the reservoir is a plant tray assembly.

10. The system as claimed in claim 5 wherein the valve is a shuttle valve.

11. The system as claimed in claim 5 wherein the reservoir has a bottom and a top, wherein the first aperture of the divider is adjacent to the bottom of the reservoir and wherein the second aperture of the divider is between the bottom and the top of the reservoir.

12. The system as claimed in claim 5 wherein the divider has a top with which the second aperture thereof aligns and wherein the divider includes a longitudinally-extending channel which extends downwards from said top thereof, the first aperture of the divider extending through the channel of the divider.

13. The system as claimed in claim 5 wherein the divider includes at least one longitudinally-extending channel that is u-shaped in lateral cross-section and arcuate-shaped in longitudinal cross-section, with the first aperture extending through said channel.

14. The system as claimed in claim 5 wherein the reservoir has a pair of spaced-apart ends and a pair of spaced-apart sides, wherein the divider has a planar top with which the second aperture thereof is aligned, the planar top of the divider extending between said sides and said ends of the reservoir, and wherein the divider includes a plurality of longitudinally-extending, evenly spaced-apart channels which extend between said ends of the reservoir, with the first aperture of the divider extending through a first one of said channels and a further aperture extending through a second one of said channels.

15. The system as claimed in claim 5 whereby when the air blower is actuated, the reservoir is configured to cause flooding fluid in the upper chamber to cover the second aperture of the divider.

16. The system as claimed in claim 15 wherein the air bubbles rise upwards and come into contact with said flooding fluid in the upper chamber covering the second aperture of the divider.

17. The system as claimed in claim 5 wherein the first aperture is a lower aperture of the divider, wherein the divider has a third aperture which aligns with the second aperture, with the second aperture and the third aperture being upper apertures of the divider, and whereby, when the air blower is actuated, the reservoir is configured to cause flooding fluid in the upper chamber to recirculate back to the lower chamber via at least said third aperture.

18. The hydroponic growth system as claimed in claim 5, wherein the divider has a longitudinally-extending channel, wherein the divider has at least one lower said aperture extending through said channel, the at least one lower said aperture of the divider being adjacent to a bottom of the reservoir, and wherein the divider has an upper said aperture aligned with a planar top of the divider.

19. The hydroponic growth system as claimed in claim 5, wherein the divider includes at least one plurality of concentrically positioned and radially spaced-apart set of arcuate-shaped baffles.

20. The hydroponic growth system as claimed in claim 5 wherein the reservoir has a top and a bottom, wherein the divider has a top between the top of the reservoir and the bottom of the reservoir, and wherein actuation of the air blower causes the fluid to flood the upper chamber in a direction extending from the top of the divider towards the top of the reservoir.

* * * * *